April 7, 1964   J. M. LIEBIG   3,128,105
SELF-ALIGNING FRONT END SEAL
Filed Jan. 26, 1962   2 Sheets-Sheet 1
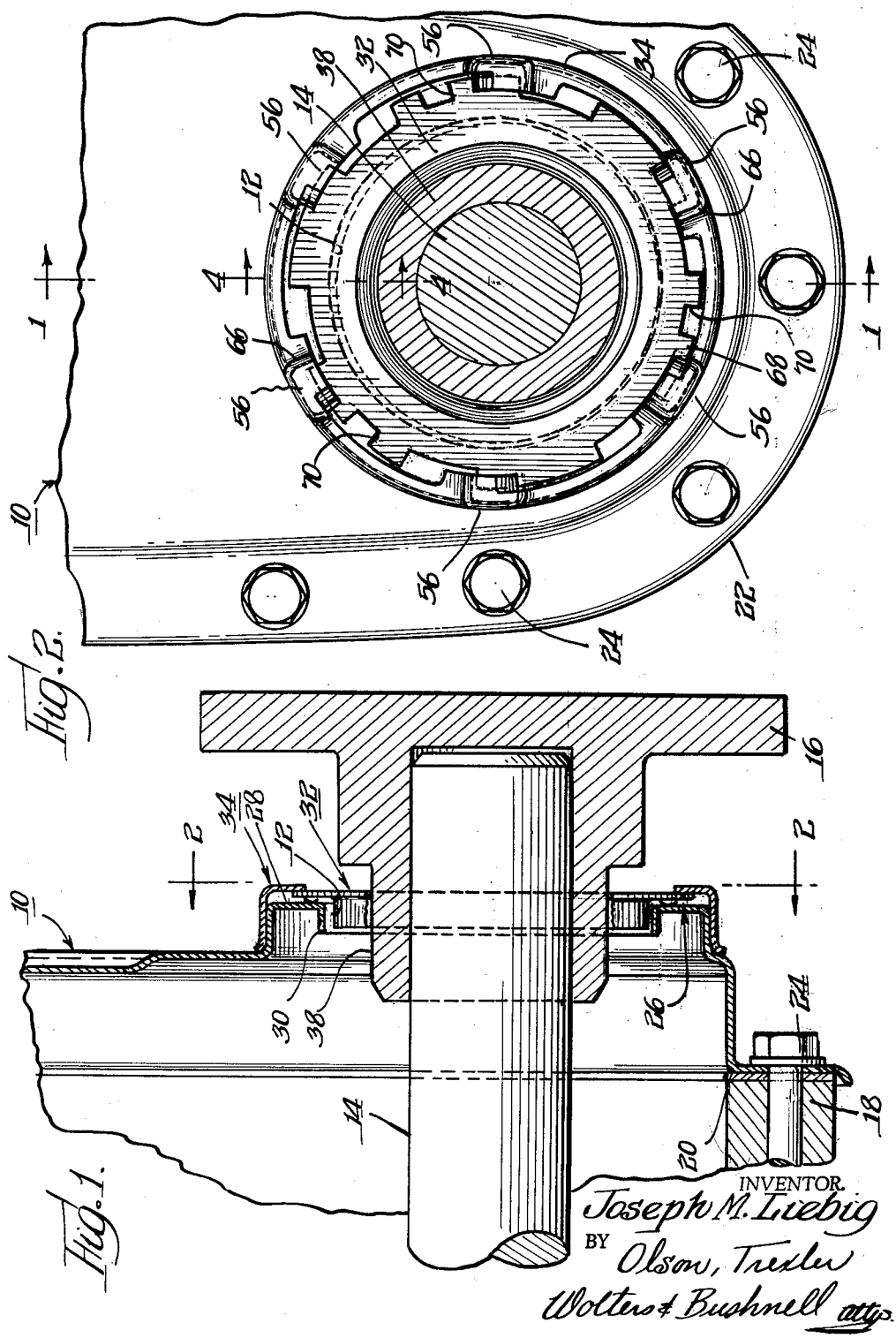
INVENTOR.
Joseph M. Liebig
BY Olson, Trexler
Wolters & Bushnell attys.

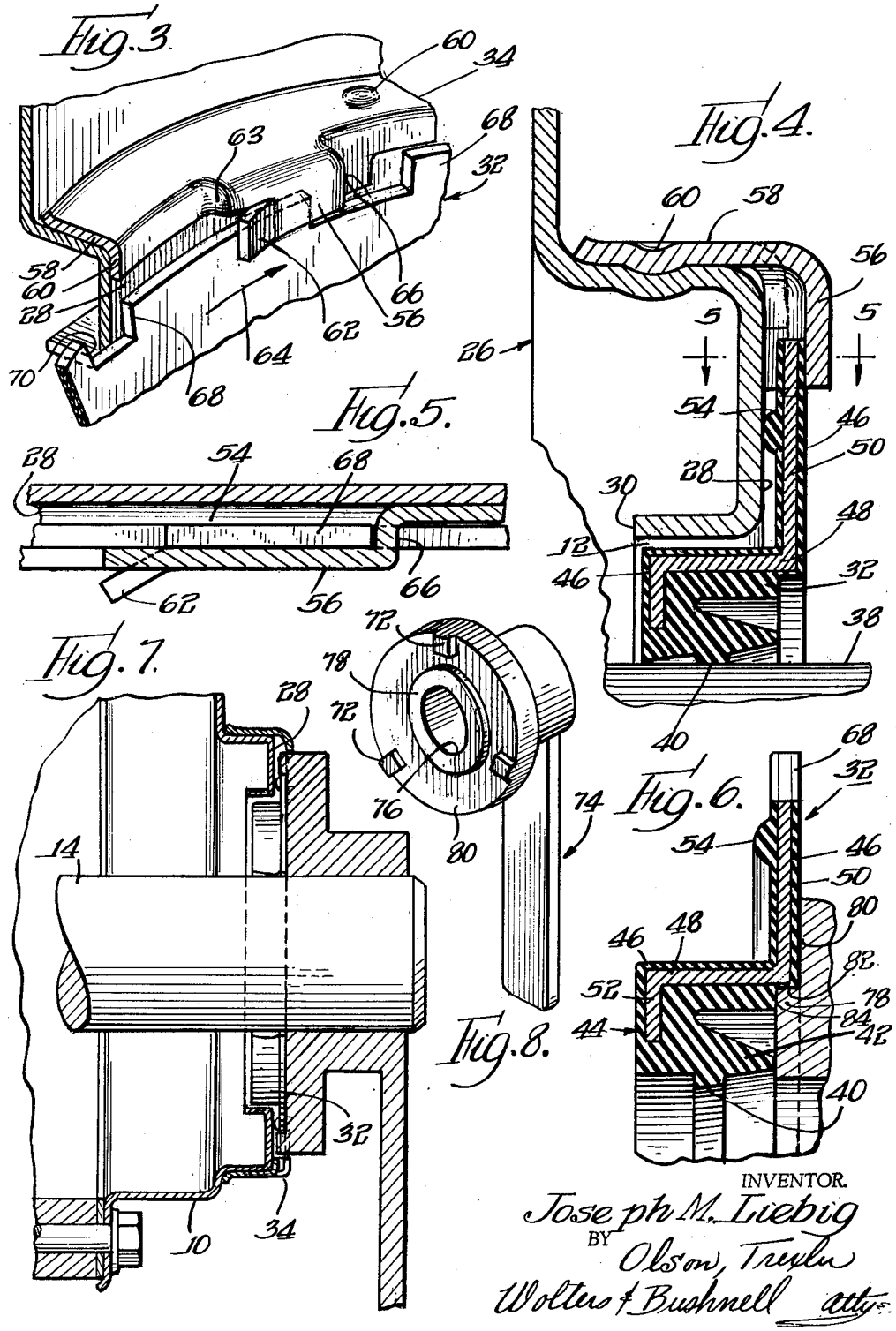

United States Patent Office 3,128,105
Patented Apr. 7, 1964

3,128,105
SELF-ALIGNING FRONT END SEAL
Joseph M. Liebig, Wheaton, Ill., assignor to Illinois Milling, Inc., Chicago, Ill., a corporation of Illinois
Filed Jan. 26, 1962, Ser. No. 169,078
9 Claims. (Cl. 277—187)

This invention pertains generally to means for sealing a housing against the escape of fluid along a rotatable member, and particularly relates to an improved construction for sealing an end of a crankshaft which projects eccentrically through an aperture in a housing.

At the front end of a crankcase of a reciprocating internal combustion engine as commonly used in automobiles, there is mounted a housing for enclosing the timing gears and chain mechanism. This housing is generally bolted onto the end of the engine block in a substantially rigid manner. The end portion of the engine crankshaft is disposed in this housing and extends outwardly therefrom through a circular opening. The end of the crankshaft may telescopically receive a sleeve of a dynamic balancer which is secured to the crankshaft for the purpose of dampening vibrations and for mounting a pulley to drive the fan, generator, etc. In certain engines the inner portion of the sleeve protrudes into the cover or housing for the timing gears through the circular opening. To prevent the escape of lubricants supplied to the timing gears, an annular seal is mounted in the opening for engagement with the balancer member.

It has been found that the opening in the cover or housing through which the crankshaft projects is frequently eccentric with respect to the longitudinal axis of the crankshaft. This condition arises from the fact that the dimensional tolerances in the manufacture of the engine block, crankshaft and housing for the timing mechanism cover may be cumulative. Hence, a slight mis-spacing of the housing with respect to the engine block or crankcase produces substantial eccentricity between the crankshaft and circular opening in the housing through which the crankshaft projects.

Prior oil sealing devices fixedly mounted on the housing or cover to seal the circular opening were, of necessity, as off-center with respect to the crankshaft as was the opening itself. The member such as a dynamic balancer, rotating within the sealed opening tended to apply a greater force along a small peripheral segment or arc of the seal than on other portions of the oil seal. This resulted in rapid wearing and sometimes burning of the elastomeric seal material. Cracks frequently developed in the highly stressed portions of the seal material thereby producing an oil leak.

It is to be appreciated that in prior constructions having the oil seal rigid with the housing or cover for the timing mechanism a leaky or otherwise defective seal was replaceable only by providing a new housing together with the oil seal carried thereby. This arrangement was expensive from the standpoint of materials as well as from the standpoint of the labor required to remove the defective cover and seal and to install the new cover onto the crankcase.

In view of the foregoing, it is an important object of this invention to provide for the sealing of an internal combustion engine crankshaft against the escape of fluid from the crankshaft housing, a new and improved oil seal construction adapted to be easily installed in encircling relationship with the rotatable member, and providing an inherent capability of producing a superior sealing action over a long service life.

Another object is to provide an improved arrangement for an oil seal which affords concentric mounting of such oil seal with respect to a rotatable member projecting eccentrically through an aperture in a housing carrying the oil seal.

Still another object is to provide an oil seal ring of the character recited which supports an annular sealing surface in concentric engagement with a circular rotatable member, such oil seal ring having means thereon for mounting in a retainer member secured to a housing about an opening through which the rotatable member eccentrically projects.

Yet another object is to provide an oil seal ring and retainer therefor of the character recited, which are cooperable fixedly to position the oil seal concentrically with the rotatable member yet to hold the ring from rotational movement generated by the rotation of said member.

A further object is to provide an improved construction for sealing a rotatable member, as recited in the above objects, which is well suited to be economically manufactured on a mass production basis, and which is well adapted to be quickly installed in co-acting relation to a rotatable member to be sealed.

Further features of the invention pertain to the particular arrangement of the elements of the oil seal ring and retainer construction whereby the above outlined and additional features are attained.

This invention, both as to its organization and manner of operation, together with further objects and advantages, will best be understood by reference to the following specification taken in connection with the accompanying drawings wherein like reference numerals designate like parts throughout, in which:

FIGURE 1 is a fragmentary sectional view illustrating the sealing of a dynamic balancer secured to the forward end of a crankshaft for an internal combustion engine, the balancer being disposed eccentrically with respect to the opening in the associated housing, the section being taken along the lines 1—1 in FIG. 2;

FIG. 2 is a fragmentary, transverse, vertical sectional view taken in the direction of the arrows along the line 2—2 in FIG. 1;

FIG. 3 is an enlarged fragmentary perspective view of a segment of the retainer member and oil seal ring of the present invention;

FIG. 4 is a greatly enlarged fragmentary sectional view taken in the direction of the arrows along the line 4—4 in FIG. 2;

FIG. 5 is a fragmentary sectional view taken in the direction of the arrows in FIG. 4;

FIG. 6 is a fragmentary sectional view taken axially through the oil seal ring of the present invention;

FIG. 7 is a sectional view similar to FIG. 1 illustrating the oil seal and retainer construction during the assembly therof on the housing, an assembly tool being shown in FIG. 7, the dynamic balancer member shown in FIG. 1 being absent; and FIG. 8 is a perspective view of a tool useful for installing the oil seal ring of the present invention in an operative position with respect to the rotatable engine member.

There is shown in FIGS. 1 and 2 of the drawings a timing mechanism cover or housing designated generally 10 having a circular aperture 12 through which an end portion of a crankshaft 14 projects, a dynamic balancing member 16 being telescoped over the end of the shaft 14 and extending therealong into the housing 10. The housing 10, preferably a sheet metal fabricated part, may be mounted on one end of an engine block or crankcase 18. The function of the housing 10 on a typical reciprocating internal combustion engine is to enclose in a fluid tight relationship the timing mechanism (not shown) including various timing gears and chains entwined therearound. A fiber gasket 20 may be interposed between a peripheral flange 22 of the housing 10 and the engine block 18 thereby to effect an oil tight joint when cap screw fasteners 24, extending through the flange 22, are threaded into engagement with complementary apertures in the block 18.

An outwardly extending collar portion 26 of the housing 10 surrounds the aperture 12 and provides a flat annular abutment surface 28 disposed at a right angle with respect to the axis of the aperture 12. The collar element 26 is annular in general form and is substantially channel shaped in axial section, shown best in FIG. 1. An inwardly extending annular flange 30 of the collar 26 defines the opening 12.

Referring now to FIG. 2, it will be understood that frequently in the assembly of an internal combustion engine, the housing 10, and most particularly the aperture 12, is mispositioned with respect to the crankshaft 14 and the balancer 16. This result obtains from the fact that production tolerances must be observed in the formation of the holes in both the block and the housing 10 for receiving the cap screws 24. This frequently results in eccentricity between the aperture 12 and the shaft 14. It is in this challenging environment that an annular oil seal, generally designated 32, and a retainer member, generally designated 34, co-operate in a manner whereby a fluid tight relationship is maintained between the housing 10 and the often eccentrically disposed balancer 16. More particularly, the annular oil seal 32 and retainer member 34, made in accordance with and embodying the principles of the present invention, co-operate with the collar portion 26 to seal the aperture 12 against the escape of oil along a hub-like portion 38 of the balancer 16.

Referring now particularly to FIGS. 4 and 6, the oil seal 32 seals the aperture 12 against the escape of oil along the hub portion 38 by providing an annular sealing surface 40 of substantial width formed on the inner periphery of the oil seal ring 32. The sealing surface 40 is supported in an improved manner which provides for radial enlargement of the sealing surface 40 to conform to the diameter of the co-acting hub portion 38, while at the same time providing assurance of optimum engagement of the sealing surface 40 with the cylindrical surface of the hub 38. The seal 32 is in an unstressed condition before being mounted in encircling relation to the hub 38, the sealing surface 40 then having a slightly conical shape, as shown in FIG. 6.

The sealing surface 40 is integrally formed on a cantilevering sealing lip 42 which, by virtue of its construction and co-action with the structure of an annular body portion 44, of the sealing ring, provides a superior radial support to the sealing surface 40.

The ring or annular body portion 44 is formed to have a generally L-shape as viewed in transverse section, FIGS. 4 and 6. The body 44 is formed structurally by an annular metal reinforcing core 48 having an L-shape, as viewed in transverse section, and embedded in a resilient elastomeric material 46; such, as for example, neoprene, silicone rubber or the like. The reinforcing core 48 is sufficiently massive to form a rigid annular section having a strength adequate to resist forces tending to cause deformation of the seal 32.

An annular flange or leg 50 extends radially outwardly from the reinforcing member 48 on the axially opposite end from an inwardly directed flange or leg 52. It is to be appreciated that the annular flange or leg 50 is an integral continuation of the reinforcing member 48 and is enclosed in a sheath of the elastomeric material 46.

An annular bead 54 of semicircular transverse section is formed integrally with the sheath of elastomeric material 46 covering the inwardly disposed face of the member 50. The oil seal ring 32 is so dimensioned that the bead 54 engages the abutment surface 28 of the collar 26 when the seal 32 is mounted on the housing 10.

To maintain the annular bead or sealing ring 54 in sealing engagement with the surface 28 the retainer member 34 is provided with a plurality of pocket-like elements 56, shown in FIG. 2. Although six pockets 56 are shown in FIG. 2 as an exemplary embodiment, it is to be appreciated that the number, in itself, is immaterial.

Referring now to FIGS. 3, 4, and 5, the retainer member 34 is a ring-like structure having a cylindrical skirt 58 adapted to be received over the collar 26 and rigidly held thereon as by dimple-like configuration 60 about the periphery of the skirt 58 and collar 26, the dimples may be reinforced or supplanted by spot welds. A short portion of the skirt 58 extends over the surface 28 of the collar 26 forming an annular retainer band 60 which is interrupted by the pockets 56 at circumferentially spaced intervals, clearly shown in FIG. 3.

The pockets 56 extend outwardly from the band 60 a distance above the surface 28 slightly less than the thickness of the bead 54 and the sheathed leg 50 of the seal 32. A tab member 62 is struck outwardly from a forward wall 63 of each pocket 56 to afford a cam surface, the function of which will appear presently. The opening in the pocket 56 over which the tab 62 is disposed is arranged to confront the direction of rotation of the member 16, this being indicated in FIG. 3 as clockwise in the direction of the arrow 64. Opposite this opening in the pocket 56 a wall 66 provides a closure and an abutment.

Tongue-like elements 68 are arranged on the periphery of the flange element 50 for co-operation with the pockets 56. More particularly, each tongue 68 is formed as a continuation of the annular leg 50 and is dimensioned to provide a degree of clearance between the outer periphery of the tongue 68 and wall member 60 of the retainer 34, shown in FIG. 3. The height of the tongues measured radially of the seal 32 is such that when a tongue 68 on the lower side of the seal 32 is deep within the associated pocket 56, the tongue 68 directly opposite thereto is operatively retained within its respectively associated pocket 56.

Referring to FIG. 2, a plurality of notches 70 is arranged intermediate the tongues 68 on the annular flange 50. The notches 70, being generally rectangular in outline and illustrated as three in number, are equally arcuately spaced, and are adapted to receive lug elements 72 of an insertion tool 74, shown in FIG. 8. For inserting the annular seal 32 within the retainer 34 the tool 74 is provided with a central aperture or bore 76 complementary to the crankshaft 14. Thus, when installing the seal 32, as shown in FIG. 7, the dynamic balancer member 16 is disassociated with the crankshaft 14. The seal 32 is inserted over the end of the crankshaft 14 against the abutment surface 28, the tongue elements 68 being slid partly under the tab elements 62. Next, the tool 74 is operatively mounted on the shaft 14 and the lugs 72 indexed with the notches 70.

The tool 74 is provided with a cylindrical projection 78 which is perfectly concentric with the central bore 76 and which projects axially from the flat face 80 thereof in the same direction as the lugs 72. The rubber or the like coating on the steel reinforcing member 48 is so thin at the inner corner thereof at 82 (FIG. 6) as to be almost non-existent. (It is exaggerated in thickness in FIGS. 4 and 6 for purposes of illustration.) The projection 78 of the tool 74 fits snugly within the sealing ring at the portion 82, butting against the thicker rubber at 84 with the flat face 80 of the tool abutting the face of the seal ring structure, whereby to render the seal ring structure 32 perfectly concentric relative to the shaft 14. The inner peripheral engagement of the tool with the seal is important in that it excludes tolerance in the radial dimensions of the seal. As the tool 74 is rotated in a clockwise direction on the shaft 14, the lugs 72 rotate the seal and the tongues 68 are urged into the pockets 56. During this short motion, the cam surfaces on the tabs 62 guide the tongues properly into the pocket 56, inward motion of each tongue 68 being arrested by the abutment wall 66 of the pocket 56. It is to be appreciated that further rotation of the seal 32 in a clockwise direction, the direction of shaft rotation, is obviated by the coaction of the tongue 68 and wall 66.

In the installed condition the bead 54 is deformed against the abutment surface 28 to provide an oil tight seal therewith. It is to be appreciated that the bead 54 is arranged inwardly of the tongue elements 68, clearly shown in FIGS. 4 and 6.

The aperture in the front cover in which the seal is installed is not necessarily concentric with the shaft 14. Accordingly, rather substantial radial clearance is provided between the aperture in the retainer 34 and the seal 32, this clearance being on the order of at least several tens of thousandths. Thus, the seal may be installed quite significantly eccentric relative to the front cover aperture. Once the seal is installed (concentric with the shaft) there are no radial forces tending to displace it, and the clamping engagement between the pockets 56 and the abutment surface 28 is quite sufficient to hold the seal in place.

While there has been described what is at present considered to be the preferred embodiment of this invention it will be understood that various modifications may be made therein, and it is intended to cover in the appended claims all such modifications as fall within the true spirit and scope of the invention.

What is claimed is:

1. A seal for preventing the escape of fluid from a housing having an abutment surface surrounding an aperture through which a rotatable member projects perhaps eccentrically, said seal comprising in combination: an annular body adapted to be received in the aperture, said body including a resiliently compliant portion having first sealing means disposed along the inner periphery thereof arranged to engage in a fluid-tight manner the rotatable member, said annular body further including a substantially inflexible outwardly projecting flange carrying resilient second sealing means arranged to engage the abutment surface surrounding the aperture to effect a fluidtight relationship between said body and the housing; and a retainer ring mounted on the housing coaxially with the aperture, said retainer ring having means thereon cooperable with said flange to bias said second sealing means firmly against the abutment surface.

2. A seal for preventing the escape of fluid from a housing having an abutment surface surrounding an aperture through which a rotatable member projects perhaps eccentrically, said seal comprising in combination: an annular body adapted to be received in the aperture, said body including a resiliently compliant portion having first sealing means disposed along the inner periphery thereof arranged to engage in a fluid-tight manner the rotatable member, said annular body further including a substantially inflexible, outwardly projecting flange carrying resilient second sealing means extending from one face axially of said body for engagement with the abutment surface surrounding the aperture to effect a fluidtight relationship between said body and the housing; and a retainer ring mounted on the housing coaxially with the aperture, said retainer ring having means thereon cooperable with said flange to press said second sealing means sealingly against the abutment surface.

3. A seal for preventing the escape of fluid from a housing having an abutment surface surrounding an aperture through which a rotatable member projects perhaps eccentrically, said seal comprising in combination: an annular body adapted to be received in the aperture, said body having first sealing means disposed along the inner periphery thereof arranged to engage the rotatable member, said annular body including an outwardly projecting flange having second sealing means extending from one face axially of said body for engagement with the abutment, surface surrounding the aperture to effect a fluidtight relationship between said body and the housing; and a ring-like retainer member having pockets circumferentially spaced apart along the central opening in said member, said retainer member being mounted on the housing coaxially with the aperture whereby said pockets are disposed over the abutment surface, said flange of said annular body having tongues receivable in said pockets for holding said second sealing means firmly against the abutment surface.

4. The combination defined in claim 3 wherein each of said pockets is provided with a cam surface along a lip thereof for guiding one of said tongues into said pocket.

5. The combination defined in claim 4 wherein one of said pockets includes an abutment wall opposite said lip arranged to engage the tongue received in said pocket for arresting in one direction further rotational movements of said seal.

6. A construction for preventing the escape of fluid from a housing having a flat abutment surface surrounding an aperture through which a rotatable member projects perhaps eccentrically, the combination comprising: an annular body formed of an elastomeric material and internally reinforced by an annular reinforcing member; an annular sealing pressure lip of said elastomeric material joined to the inner periphery of said body and cantilevering along the axis of said body for sealing by concentric engagement with the rotatable member, said annular reinforcing member having an annular leg extending radially outwardly at one end of said body; an annular embossment of said elastomeric material disposed on said leg and extending axially of said body away from said one end thereof; and a ring-like retainer member having pockets circumferentially spaced apart along the central opening in said member, said retainer member being adapted for mounting on the housing coaxially with the aperture whereby said pockets are disposed over the abutment surface, said annular leg having means thereon radially outwardly of said embossment and cooperable with said pockets for urging said embossment into sealing engagement with the abutment surface and for holding said body eccentrically with the aperture in the housing.

7. The combination defined in claim 6 wherein said annular leg is enclosed in a sheath of said elastomeric material.

8. A construction for preventing the escape of fluid from a housing having a flat abutment surface surrounding an aperture through which a rotatable member projects perhaps eccentrically, the combination comprising: an annular body formed of an elastomeric material and internally reinforced by an annular reinforcing member; an annular sealing pressure lip of said elastomeric material joined to the inner periphery of said body and cantilevering along the axis of said body for sealing by concentric engagement with the rotatable member, said annular reinforcing member having an annular leg extending radially outwardly at one end of said body; the outer periphery of said annular leg having a plurality of tongues spaced circumferentially therealong and extending outwardly in the general plane of said leg; a circular bead of said elastomeric material disposed on a surface of said leg; and a ring-like retainer member having pockets circumferentially spaced apart along the central opening in said member, said retainer member being adapted for mounting on the housing coaxially with the aperture whereby said pockets are disposed over the abutment surface, said tongues being receivable in said pockets for maintaining said bead in sealing engagement against the abutment surface.

9. The combination defined in claim 7 wherein said pockets on said ring-like retainer member have a depth axially of said ring less than the combined thickness of said annular leg and said bead, and said pockets are each provided with cam members for guiding said tongues into the respective ones of said pockets.

References Cited in the file of this patent

UNITED STATES PATENTS

| | | |
|---|---|---|
| 2,565,571 | Naumann | Aug. 28, 1951 |
| 2,593,219 | Thomas | Apr. 15, 1952 |
| 2,966,169 | Reece | Dec. 27, 1960 |
| 3,054,620 | Schwing | Sept. 18, 1962 |